(12) United States Patent
Walterbusch

(10) Patent No.: US 6,499,729 B1
(45) Date of Patent: Dec. 31, 2002

(54) HYDRAULIC ENGINE MOUNTING DEVICE

(75) Inventor: John Aloys Walterbusch, Dayton, OH (US)

(73) Assignee: Delphi Technologies Inc., Troy, MI (US)

( * ) Notice: Subject to any disclaimer, the term of this patent is extended or adjusted under 35 U.S.C. 154(b) by 0 days.

(21) Appl. No.: 09/575,853

(22) Filed: May 19, 2000

(51) Int. Cl.⁷ .................................................. F16F 5/00
(52) U.S. Cl. .............................. 267/140.13; 267/141.6
(58) Field of Search ........................ 267/140.13, 140.11, 267/141.4, 141.6, 141.7, 140.14; 248/562, 636

(56) References Cited

U.S. PATENT DOCUMENTS

| | | |
|---|---|---|
| 4,762,309 A | 8/1988 | Hutchins |
| 5,516,084 A | 5/1996 | Rizzo |
| 5,782,462 A | 7/1998 | Hein et al. |
| 6,036,183 A | 3/2000 | Lee et al. |

Primary Examiner—Jack Lavinder
Assistant Examiner—Xuan Lan Nguyen
(74) Attorney, Agent, or Firm—Scott A. McBain

(57) ABSTRACT

An improved hydraulic engine mounting device is provided which includes a main body defined by first and second shells. Each of these shells contains a chamber separated from each other by an orifice assembly. The first shell includes a flange for supporting the orifice assembly the second shell interengaging with the first shell at the flange area. The diaphragm is interposed between the second shell and the orifice assembly within the second chamber. The orifice assembly includes a ledge portion extending about an outer perimeter of the orifice assembly, the perimeter of the diaphragm captured between the ledge portion and the perimeter of the second shell. A plastically deforming perimeter of the first shell presses the diaphragm between the orifice and the second shell to provide a tight hydraulic seal.

15 Claims, 3 Drawing Sheets

110 A  120 A

110 B

120 B

140 C

110 C  120 C

110 D

120 D

HYDRAULIC ENGINE MOUNTING DEVICE

The present invention relates to an improved hydraulic engine mounting device and specifically a hydraulic engine mount, which is simpler to construct and assemble than prior art devices.

BACKGROUND OF THE INVENTION

An automobile engine is subject to complex vibration effects that produce multiple combinations of forces. As such it is necessary to insulate the automobile from engine vibrations and unwanted movements of the engine with an antivibration system. Such a system reduces the vibrations to relatively small spring forces, which are transmitted to the support mountings.

Engine mounting systems have progressed from simple rubber components to engineered fluid powertrain mounts. Relatively all engine support mounts feature rubber or another elastomeric compound as comprising at least a portion of the spring medium for the support. It is resilient by virtue of its high deflection to load ratio. Rubber also has an inherent self-damping effect that helps prevent resonant vibration.

The typical hydraulic mount includes a pumping chamber surrounded by relatively thick elastomeric walls with an orifice track extending between the pumping chamber and a reservoir that is generally surrounded by a flexible rubber diaphragm. The reservoir is typically located on the opposite side of a partition from the pumping chamber. When load is applied to the hydraulic mount, compression of the mount pressurizes the fluid in the pumping chamber. The pressurization causes the fluid to flow through the orifice track to the reservoir. When load is removed, i.e. during a rebound situation, fluid is drawn back to the pumping chamber from the reservoir. The geometry of the pumping chamber, orifice track and reservoir are typically tuned for specific applications so that the fluid in the orifice track resonates at certain frequencies. Thus, a peak damping effect at a selected frequency can be achieved resulting in a reduction in the harshness of a vehicle ride from both road and engine induced vibrations. As such, some form of hydraulic mount is generally preferred in most applications.

However, hydraulic mounts are generally costly and/or difficult to assemble. A hydraulic (or fluid tight) seal must be achieved between the pumping chamber and the reservoir. This seal must also be able to withstand the pressures within the pumping chamber. To-date, the seal between the pumping chamber and the reservoir has used the perimeter edge of the rubber diaphragm (which often defines the periphery of the pumping chamber) as a fluid seal. However, constructing the fluid seal has typically added to the cost of the hydraulic mount.

As can be seen from FIGS. 1A–1D, the added cost comes from added material costs, added labor costs to construct, or a combination thereof. FIG. 1A shows a rubber diaphragm 110a of which the edge portion must be wrapped around an orifice assembly 120a before the remainder of the hydraulic mount is assembled. In a variation of FIG. 1A, FIG. 1D also shows the edge of rubber diaphragm 110d wrapped around the base plate and held against the orifice assembly 120d. Both of these variations are expensive to assemble. FIG. 1B shows a recessed trough in orifice assembly 120b within which the edge of rubber diaphragm 110b is placed. Machining a trough or casting a trough in orifice assembly 120b adds significantly to the overall cost. The rubber diaphragm 110c of FIG. 1C has a metal ring 140c molded into the edge portion. Molded metal ring 140c provides structure to that portion of the diaphragm to keep diaphragm 110c in place. Such a metal ring adds significantly to the manufacturing costs of the diaphragm and thus to the overall costs of the hydraulic mount.

SUMMARY OF THE INVENTION

Accordingly, it is a feature of the present invention to provide a hydraulic mount that overcomes the disadvantages of prior art hydraulic mounts in that a hydraulic mount is economically manufactured and assembly is simplified. This result is preferably accomplished with use of a orifice assembly that includes a ledge. The ledge cooperates with a fluid sealing surface of, preferably, the diaphragm resulting in a fluid seal and a hydraulic mount that is easy to assemble and inexpensive to manufacture. The hydraulic mount of the present invention requires no additional parts and the entire hydraulic mount can be assembled by simply dropping each of the component parts into place and crimping the perimeter.

This feature, along with other features in the present invention, is achieved in a hydraulic mounting device which comprises a main body defined by a shell. This shell includes first and second portions as well as first and second chambers within the shell. The first chamber is separated from the second chamber by an orifice assembly. The first shell portion includes a flange portion for supporting the orifice assembly, the flange portion having a plastically deforming perimeter. The second shell portion interengages with the first shell portion at the flange portion. A diaphragm is interposed between the second shell portion and the orifice assembly within the second chamber. The orifice assembly includes a ledge portion extending about an outer perimeter of the orifice assembly. In a preferred embodiment the perimeter of the diaphragm is captured between the ledge portion and the perimeter of the second shell portion. The plastically deforming perimeter of the first shell is used to compress the diaphragm between the orifice and the second shell to provide a hydraulic seal. In a preferred embodiment of the invention, the ledge portion includes a step portion of a stamped plate together with an outer perimeter edge of a smaller plate.

In accordance with another aspect of the invention, an orifice assembly for a hydraulic mount is provided. The orifice assembly is used to separate the mount into a first chamber and a second chamber. The orifice assembly comprises at least a first plate of a first diameter and a second plate of a second diameter, the first diameter being larger than the second diameter and each of the plates including first and second orifice areas with openings which cooperate to define a fluid path between the first and second chambers. The step portion on a outer portion of a first plate cooperates with an outer perimeter edge of the second plate to create a ledge portion on a outer perimeter of the orifice assembly. In a preferred embodiment of the invention, the first plate includes an interior portion and the step portion includes a riser portion extending radially outward from the interior portion. A tread portion extends radially outward from the riser portion, the outer perimeter edge of the second plate being generally radially aligned with the riser portion.

Another aspect of the invention includes a method of constructing a hydraulic mount. This method comprises providing a main body including a first and second shell portions each having an outside diameter. It includes providing a flange portion for supporting the orifice assembly on the first shell portion and providing a flange portion with a plastically deforming perimeter on its outside diameter. An orifice assembly is provided which has an outside diameter and has a ledge portion extending about an outer perimeter of the orifice assembly which terminates at its outside diameter edge. Finally, an elastomeric diaphragm is provided. It has an outer edge area terminating in an outside diameter generally the same as the outside diameter of the second shell portion and the outside diameter of the orifice assembly.

The hydraulic mount can be assembled while submerged in fluid or the mount can be assembled dry and then filled with fluid after assembly. In a preferred embodiment, it is an antifreeze such as ethylene glycol. The orifice assembly is then placed within the first shell portion with the outer perimeter of the orifice assembly sitting on the flange portion of the first shell. The diaphragm is then placed on the ledge portion of the orifice assembly and the second shell portion is placed over the diaphragm. The outer edge area of the diaphragm is captured between the second shell portion and the ledge portion. The plastically deforming perimeter of the first shell is then bent radially inward onto the second shell portion. This compresses the diaphragm sufficiently to provide a hydraulic tight seal (or fluid seal) at the ledge portion of the orifice assembly. Each of the described components is preferably sized for easy vertical self centering assembly.

Thus it is a principal object of the present invention to provide a hydraulic mount which is easily assembled and yet provides a robust and secure hydraulic seal.

It is yet another object of the present invention to provide a hydraulic mount which is designed for quick and easy vertical self centering assembly.

Still another object of the present invention is to provide an improved hydraulic mount which is manufactured with lower cost, easily produced parts.

These and other objects of the invention will become apparent to those skilled in the art upon reading and understanding the following detailed description of the invention.

BRIEF DESCRIPTION OF DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE INVENTION

Figure 1:
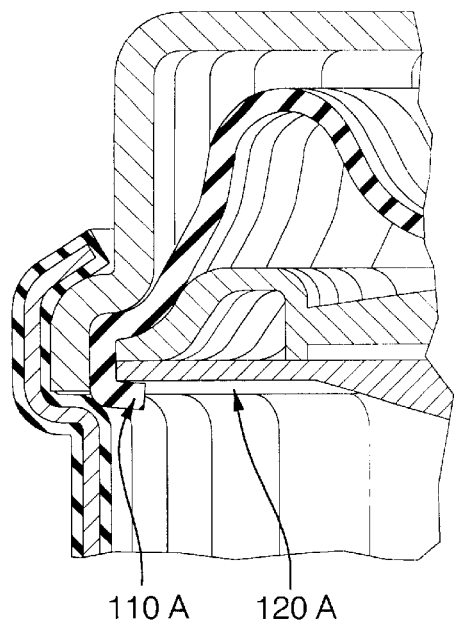
FIGS. 1A through 1D are detailed views partially in cross-section, showing prior art relating to the present invention.
Figure 1:
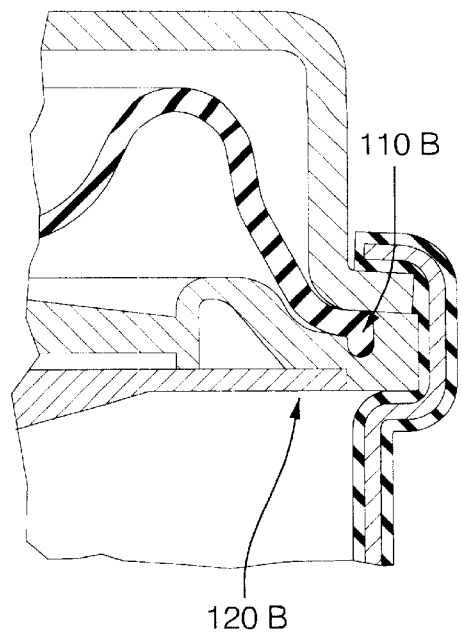
Figure 1:
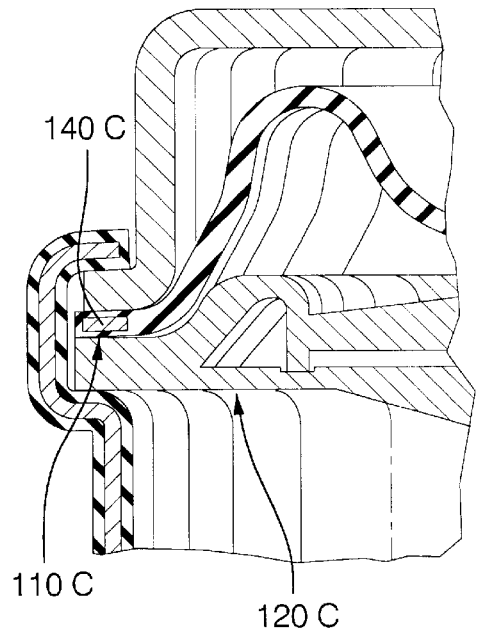
Figure 1:
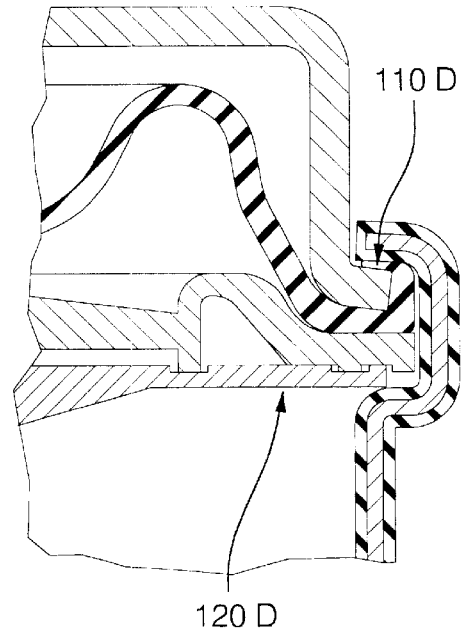
Figure 2:
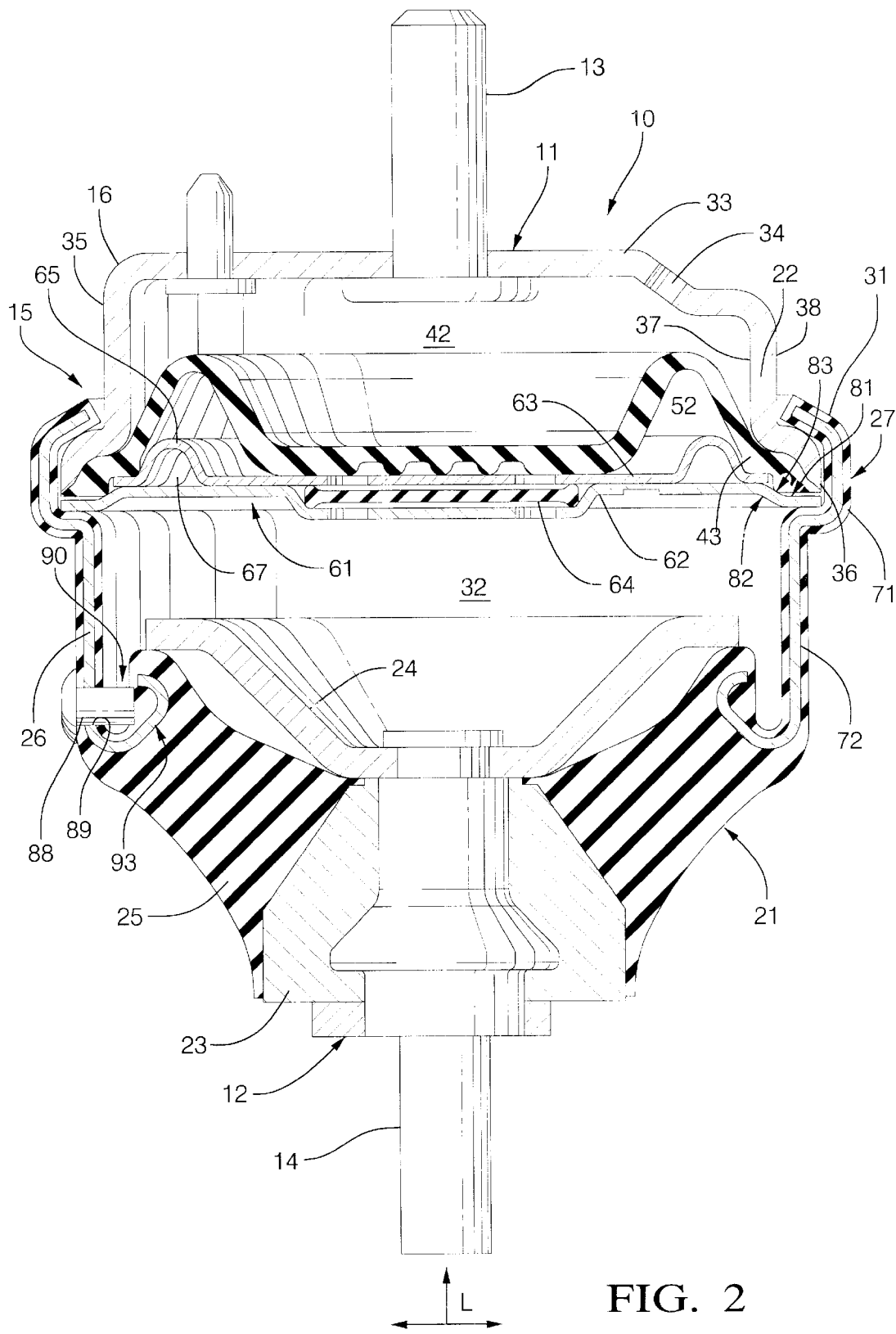
FIG. 2 is an elevation view partially in cross-section, showing a hydraulic mount of the present invention.

Referring to the drawings, wherein the showings are for the purpose of illustrating the preferred embodiment of the invention only and not for the purpose of limiting same, FIG. 2 shows a preferred embodiment of the hydraulic engine mounting device 10 of the present invention. Hydraulic mount 10 general comprises a pair of mounting members 11 and 12 having aligned outwardly projecting studs 13 and 14, respectfully, by which engine mount 10 is connected to an engine and a vehicle frame or an engine cradle (not shown). Engine mount 10 further includes a main body 15 comprised of an outer shell 16. Outer shell 16 includes two portions, a main element 21 and a metal base plate 22. Main element 21 is molded and/or pieced with a number of component parts. These component parts include projecting stud 14 described herein above which is connected to a metal rim portion 23 and a bell shaped metal internal interlock 24. Main element 21 further includes a main rubber element 25 and a metal cylindrical insert 26 which provides structural rigidity. Therefore the cup shape of main element 21 forms a lower fluid chamber 32 which, during assembly, is filled with anti-freeze fluid such as ethylene glycol. Metal insert 26 also provides the structure necessary at the perimeter 27 of main element 21 to create a plastically deforming perimeter portion 31 for purposes that will be described hereinafter.

Metal base plate 22 is also a generally cup-shaped part, designed to mate with main element 21 to form outer shell 16. In this regard it includes a base area within which there is an air vent 34. Extending generally and orthogonally therefrom is a cylindrical section 35 terminating in a perimeter end 36 extending between an inner and an outer surface 37 and 38, respectfully. Adjacent perimeter end 36 is a bell shaped step 41. As can be seen from FIGS. 2 and 3 the outer diameter of metal base plate 22 at perimeter end 36 is generally the same as the inner diameter of main element 21 at plastically deforming perimeter portion 31. The interior of the cup shaped metal base plate 22 forms an expansion chamber 42.

A rubber or elastomeric diaphragm 43 is situated below expansion chamber 42. Diaphragm 43 has an interior and exterior surface 44 and 45, respectfully. A periphery edge 46 extends between surfaces 44 and 45. An outer edge area 48 includes a lock step 47 terminating in the periphery edge 46. The outer diameter of periphery edge 46 is generally equal to the outer diameter of perimeter end 36. As will be appreciated from FIG. 2, the construction of diaphragm 43 acts as a bladder to form an upper fluid chamber 52.

Lower fluid chamber 32 is separated from upper fluid chamber 52 by an orifice assembly 61 which includes a first stamped plate 62 a second stamped plate 63 and a generally rubber decoupler 64. Second plate 63 includes a step ring 65 which forms orifice track 67.

Referring now to FIG. 2, as is well known when a load L is applied to hydraulic mount 10, main element 21 deforms causing the fluid within lower fluid chamber 32 to be pumped through a torturous path (including orifice track 67) of orifice assembly 61 into upper fluid chamber 52. As is also known, load L may include other force vectors, as represented in FIG. 2. Diaphragm 43 retains fluid therein and is allowed to expand into expansion chamber 42.

Figure 3:
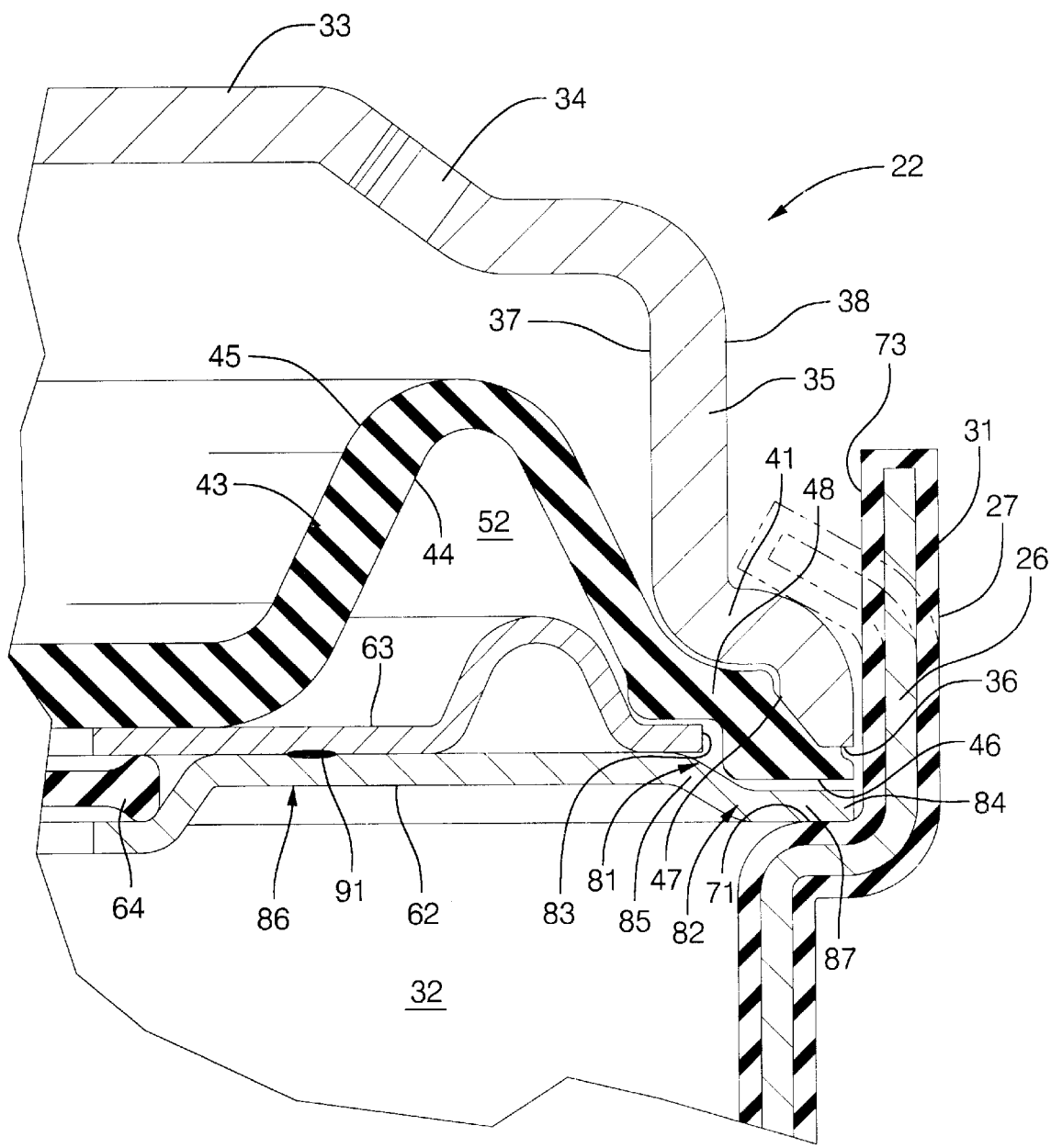
FIG. 3 is a detailed view of the perimeter of a hydraulic mount of the present invention during assembly.

Main element 21 is provided with a flange portion 71 adjacent plastically deforming perimeter portion 31. Flange portion 71 extends between a chamber portion 72 and perimeter portion 31 of main element 21, and is generally orthogonal to each prior to assembly as shown in FIG. 3. As shown in FIGS. 2 and 3, the outer diameter of main element 21 is greatest at perimeter portion 31. An inner surface 73 of perimeter portion 31 has an inner diameter generally equal to the outer diameter of orifice assembly 61, the outer diameter of diaphragm 43 and the outer diameter of metal base plate 22.

Orifice assembly 61 includes a ledge portion 81 extending about an outer perimeter of the orifice assembly. Ledge portion 81 is comprised of a step portion 82 of first plate 62 and an outer perimeter edge 83 of second plate 63. Both step ring 65 and step portion 82 may be formed in first plate using known methods. It can be seen especially from FIG. 3 that first plate 62 is of a larger diameter than second plate 63 and terminates in an outside end 84. Step portion 82 includes a riser 85 extending radially outward from an interior portion 86 of first plate 62. A tread portion 87 extends radially outward from riser 85. Riser 85 extends at an angle relative to both tread portion 87 and interior portion 86. As shown this angle is approximately 45°. However, the angle can vary greatly depending on the width and extent of outer perimeter edge 83. Prior to assembly of hydraulic mount 10 the smaller diameter second plate 63 is spot welded at spot weld 91 to first plate 62 in such a manner that outer perimeter edge 83 is generally radially aligned with riser 85. Since both first and second plates 62 and 63 are metal stamped plates, outer perimeter edge 83 and outside end 84 have well defined corners for purposes of the invention. The definition of ledge portion 81 is enhanced by aligning step portion 82 with outer perimeter edge 83. However it will be appreciated that ledge portion 81 can also be formed using other variations of steps and end shapes. The shape and size of diaphragm 43 as above described allows its periphery edge 46 to drop over ledge portion 81 and specifically make contact with step portion 82, while its interior surface 44 can be tightly compressed against outer perimeter edge 83 during assembly. Thus a tight hydraulic seal can be achieved.

Once orifice assembly 61 has been constructed in the manner set forth above, hydraulic mount 10 may be assembled. In a preferred embodiment mount 10 is assembled dry and then filled with fluid after assembly in a manner described hereinafter. Assembly of mount 10 also includes placing orifice assembly 61 within main element 21. The outer perimeter of orifice assembly 61 (terminating at the outside end 84) rests on flange portion 71. Diaphragm 43 is then placed on ledge portion 81 of orifice assembly 61. Specifically, periphery edge 46 placed in contact with tread portion 87 of step portion 82. Metal base plate 22 is then placed over diaphragm 43. More specifically, perimeter end 36 and inner surface 37 are placed in contact with outer surface 45, thereby capturing an outer edge area 48 of diaphragm 43 between metal base plate 22 and ledge portion 81. By bending plastically deforming perimeter portion 31 radially inward and into contact with metal base plate 22 (as seen from the phantom lines of FIG. 3), diaphragm 43 in the area of lock step 47 is compressed sufficiently against outer perimeter edge 83, riser 85 and tread portion 87 to provide a tight hydraulic seal at ledge portion 81. By virtue of its geometry of component parts, the invention of hydraulic mount 10 is self-centering during assembly. Component parts including orifice assembly 61, elastomeric diaphragm 43 and base plate 22 need only be dropped into place.

In order that the present invention can be assembled dry, a rivet 88 is used to close a fluid passage 89 through which hydraulic fluid is placed within lower fluid chamber 32 of main element 21. In a preferred embodiment, the hydraulic fluid is an antifreeze such as ethylene glycol or similar substance. A unique feature of the invention is the formation of a channel 90 within metal cylindrical insert 26. As seen from FIG. 2, channel 90 extends below an outer edge 93 of insert 26 into main rubber section 25. Thus a perimeter channel or depression 90 is formed within lower fluid chamber 32. Channels 90 and edge 93 protect rivet 88 from possible damage due to movement of interlock 24 during dynamic loading of mount 10.

This easily assembled, "stack in and crush shut" method provides rigid support of the orifice assembly 61 and a robust and secure hydraulic tight seal. It is an advantage over the prior art, as seen in FIGS. 1A through 1D, which involve the use of higher cost bulkier die cast aluminum orifice plates or harder to assemble stamped steel plates with wrap-around diaphragms. Use of more expensive diaphragms with metal rings molded into the perimeter is also avoided.

The invention has been described with reference to the preferred embodiment. Obviously, modifications and alterations will occur to others upon reading and understand this specification. For example, it will be appreciated that there are other methods of assembling mount 10 dry and then filling with fluid after assembly. However, the known methods heretofore available use a plug located between an interlock and orifice assembly. Thus when a load L is applied, together with any load from a different direction, the plug may catch on the interlock during movement and/or dynamic loading. It will also be appreciated that mount 10 may be assembled while submerged in hydraulic fluid in a known manner. Therefore, the lower fluid chamber can be filled during assembly. The invention as applied to a cylindrical mount. However, the invention can be equally applied to a variety of other shapes including oval, rectangular, square, etc. It is intended to include all such modifications and alternations insofar as they have come within the scope of the appended claims.

Having thus described the invention, it is claimed:

1. A hydraulic mount comprising a main body defined by a shell including first and second portions, a first chamber and a second chamber within said shell, said first chamber separated from said second chamber by an orifice assembly comprised of at least one stamped plate, said first shell portion including a flange portion for supporting said orifice assembly, said flange portion having a plastically deforming perimeter, said second shell portion inter-engaging with said first shell portion at said flange portion, a diaphragm having a resilient periphery interposed between and separating said second shell portion and said orifice assembly within said second chamber, said orifice assembly including a ledge portion extending about an outer perimeter of said orifice assembly wherein said ledge portion includes a step portion of said stamped plate, said resilient periphery of said diaphragm captured between said ledge portion and the perimeter of said second shell portion and having no intermediate member therebetween, said plastically deforming perimeter compressing said diaphragm between said orifice assembly and said second shell to provide a hydraulic seal.

2. The hydraulic mount of claim 1, wherein said ledge portion includes an outer perimeter edge of a second plate.

3. A hydraulic mount comprising a main body defined by a shell including first and second portions, a first chamber and a second chamber within said shell, said first chamber separated from said second chamber by an orifice assembly including at least first and second adjacent plates wherein said first plate is of a larger diameter than said second plate, said first shell portion including a flange portion for supporting said orifice assembly, said flange portion having a plastically deforming perimeter, said second shell portion inter-engaging with said first shell portion at said flange portion, a diaphragm having a resilient periphery interposed between and separating said second shell portion and said orifice assembly within said second chamber, said orifice assembly including a ledge portion extending about an outer perimeter of said orifice assembly, said resilient periphery of said diaphragm captured between said ledge portion and the perimeter of said second shell portion and having no intermediate member therebetween, said plastically deforming perimeter compressing said diaphragm between said orifice assembly and said second shell to provide a hydraulic seal.

4. The hydraulic mount of claim 3, wherein said ledge portion is comprised of a perimeter edge of said second plate and a step portion along the perimeter of said first plate.

5. An orifice assembly for a hydraulic mount used to separate said mount into a first chamber and a second chamber, said orifice assembly comprising at least a first plate of a first diameter and a second plate of a second diameter, said first diameter being larger than said second diameter, each of said first and second plates including an orifice area with openings which cooperate to define a fluid path between said first and said second chamber, a step portion on an outer portion of said first plate cooperating with and primarily radially exterior to an outer perimeter edge of said second plate to create a ledge portion on an outer perimeter of said orifice assembly, and further wherein said step portion is primarily intermediate between said outer perimeter edge of said second plate and said ledge portion.

6. The orifice assembly of claims 5, wherein first plate includes an interior portion, said step portion includes a riser extending radially outward from said interior portion and a tread portion extending radially outward from said riser.

7. The orifice assembly of claim 6, wherein said outer perimeter edge is generally radially aligned with said riser.

8. The orifice assembly of claim 6, wherein said riser extends at an angle relative to said tread portion.

9. The orifice assembly of claim 8, wherein said outer perimeter edge is generally radially aligned with said riser.

10. A method of constructing a hydraulic mount comprising:

providing a main body including first and second shell portions each having an outside diameter;

providing a flange portion for supporting said orifice assembly on said first shell portion and providing said flange portion with a plastically deforming perimeter on its outside diameter;

providing an orifice assembly having an outside diameter and having a ledge portion extending about an outer perimeter of said orifice assembly and terminating at an outside diameter edge;

providing an elastomeric diaphragm having a resilient outer edge area terminating in an outside diameter generally the same as said outside diameter of said second shell portion and said outside diameter of said orifice assembly;

placing said orifice assembly within said first shell portion and resting said outer perimeter of said orifice assembly on said flange portion;

placing said diaphragm on said ledge portion of said orifice assembly;

placing said second shell portion over said diaphragm, said diaphragm separating said second shell portion from said orifice assembly; and bending said plastically deforming perimeter radially inwardly and into contact with second shell portion compressing said diaphragm between said ledge portion and said second shell portion with no intermediate member therebetween sufficiently to provide a hydraulic seal at said ledge portion of said orifice assembly.

11. The method of claim 10, including filling said first shell portion with a hydraulic fluid.

12. The method of claim 10, including providing a first and a second plate for said orifice assembly.

13. The method of claim 12, wherein said first plate includes a step portion and said second plate includes an outer perimeter edge which co-act to form a ledge portion, and placing said diaphragm on said step portion and against said outer perimeter edge thereby locking said diaphragm in place.

14. The method of claim 12, including said first plate being of larger diameter than said second plate and welding said first and second plates together prior to said step of placing said orifice assembly within said first shell portion.

15. The method of claim 14, wherein said first plate includes a step portion and said second plate includes an outer perimeter edge which co-act to form said ledge portion, and placing said diaphragm on said step portion and against said outer perimeter edge thereby locking said diaphragm in place.

* * * * *